(12) United States Patent
Pepe (10) Patent No.: US 7,854,624 B1
(45) Date of Patent: Dec. 21, 2010

(54) PANEL ASSEMBLY FOR A CONNECTIVITY MANAGEMENT SYSTEM

(75) Inventor: Paul John Pepe, Clemmons, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 12/508,153

(22) Filed: Jul. 23, 2009

(51) Int. Cl.
*H01R 13/66* (2006.01)
(52) U.S. Cl. .................................. 439/489; 439/540.1
(58) Field of Classification Search .............. 439/676, 439/488–490, 395, 540.1
See application file for complete search history.

(56) References Cited

U.S. PATENT DOCUMENTS

| | | | |
|---|---|---|---|
| 6,120,318 | A | 9/2000 | Reed et al. |
| 6,540,564 | B1 | 4/2003 | Ko |
| 6,626,697 | B1 | 9/2003 | Martin et al. |
| 6,655,988 | B1 | 12/2003 | Simmons et al. |
| 6,802,735 | B2 | 10/2004 | Pepe et al. |
| 6,976,867 | B2 | 12/2005 | Navarro et al. |
| 7,077,707 | B2 | 7/2006 | Hyland et al. |
| 7,153,142 | B2 * | 12/2006 | Shifris et al. .................. 439/49 |
| 2003/0232535 | A1 | 12/2003 | Pepe et al. |
| 2004/0192094 | A1 | 9/2004 | Navarro et al. |
| 2004/0219827 | A1 | 11/2004 | David et al. |
| 2009/0075516 | A1 | 3/2009 | Pepe et al. |

FOREIGN PATENT DOCUMENTS

WO  WO 2006/063023 A1   6/2006

OTHER PUBLICATIONS

International Search Report, International Application No. PCT/US2010/002037, International Filing Date Jul. 20, 2010.

\* cited by examiner

*Primary Examiner*—Michael C Zarroli (57) ABSTRACT

A panel assembly includes a panel having an opening therethrough that selectively receives either a first cassette or a second cassette, where the first and second cassettes have front and rear mating interfaces that mate with cable connectors. The first cassette has at least one of the front and rear mating interfaces being different than the front and rear mating interfaces of the second cassette, respectively. A connectivity sensor is mounted to either the first cassette or the second cassette depending on which of the first cassette and the second cassette is received in the opening of the panel. The connectivity sensor senses a connectivity status of the front mating interface of the corresponding first cassette or second cassette and generates a connectivity status signals relating to the connectivity status. An input/output connector is held by the panel. The input/output connector is electrically connected to the connectivity sensor and is configured to be electrically connected to an input/output cable of a connectivity management system that monitors the connectivity status signals of the connectivity sensor.

22 Claims, 8 Drawing Sheets

PANEL ASSEMBLY FOR A CONNECTIVITY MANAGEMENT SYSTEM

BACKGROUND OF THE INVENTION

The subject matter herein relates generally to connectivity management systems, and more particularly to a panel assembly for a connectivity management system.

Known connector assemblies exist having multiple receptacle connectors in a common housing, which provide a compact arrangement of such receptacle connectors. Such a connector assembly is useful to provide multiple connection ports. Accordingly, such a connector assembly is referred to as a multiple port connector assembly. The connector assemblies are typically used in data communication networks and are mounted within a frame or rack. The connector assemblies are typically mounted within a patch panel.

Problems arise due to the large number of cables that are connected within such systems. Cable management systems and connectivity management systems have been developed to address such problems. For example, in order to better operate large electrical networks, connectivity management systems have been developed to monitor connections between components within the network. The patch panels include sensor bars that are fixed to the patch panels and that monitor a connectivity status of the connector assemblies mounted within the patch panel.

Known connectivity management systems are not without disadvantages. For instance, the connectivity management systems are typically designed for one particular type of connector assembly and one particular type of patch cord. However, different electrical networks utilize different types of connector assemblies and different types of patch cords. A different connectivity management system is designed for the different networks and connectors associated with such networks. For example, a different patch panel is provided for each different type of network. The patch panel includes sensors that monitor the connectivity status of the various network components used with the patch panel.

BRIEF DESCRIPTION OF THE INVENTION

In one embodiment, a panel assembly is provided including a panel having an opening therethrough that selectively receives either a first cassette or a second cassette, where the first and second cassettes have front and rear mating interfaces that mate with cable connectors. The first cassette has at least one of the front and rear mating interfaces being different than the front and rear mating interfaces of the second cassette, respectively. A connectivity sensor is mounted to either the first cassette or the second cassette depending on which of the first cassette and the second cassette is received in the opening of the panel. The connectivity sensor senses a connectivity status of the front mating interface of the corresponding first cassette or second cassette and generates a connectivity status signals relating to the connectivity status. An input/output connector is held by the panel. The input/output connector is electrically connected to the connectivity sensor and is configured to be electrically connected to an input/output cable of a connectivity management system that monitors the connectivity status signals of the connectivity sensor.

In another embodiment, a panel assembly is provided including a panel having an opening therethrough that selectively receives a first cassette and a second cassette. The first cassette includes a housing having a front mating interface and a rear mating interface with discrete plug cavities at the front mating interface. The housing has at least one connector module at the rear mating interface and communication modules transmitting signals from the plug cavities to the at least one connector module. The second cassette includes a housing having a front mating interface and a rear mating interface, wherein at least one of the front mating interface and the rear mating interface of the second cassette differs from the front mating interface and the rear mating interface of the first cassette. The housing has discrete plug cavities at the front mating interface, at least one connector module at the rear mating interface, and communication modules transmitting signals from the plug cavities to the at least one connector module. A connectivity sensor is mounted to either the first cassette or the second cassette depending on which of the first cassette and the second cassette is coupled to the panel. The connectivity sensor senses a connectivity status of the plug cavities of the corresponding first cassette or second cassette.

In yet another embodiment, a panel assembly is provided including a panel having an opening therethrough and a cassette loaded into the opening. The cassette includes a housing having discrete plug cavities at a front of the housing that are configured to receive cable mounted plugs therein. The cassette has communication modules transmitting signals from the plug cavities to at least one connector module at a rear of the housing. A connectivity sensor is mounted to the cassette. The connectivity sensor senses a connectivity status of the plug cavities.

In a further embodiment, a panel assembly is provided including a panel having first and second openings therethrough and a window positioned between the first and second openings. Cassettes are loaded into the first and second openings. The cassettes each include a housing having discrete plug cavities at a front of the housing that are configured to receive cable mounted plugs therein. The cassette has communication modules transmitting signals from the plug cavities to at least one connector module at a rear of the housing. A connectivity sensor is mounted to the cassettes along the front of each of the housings. The connectivity sensor senses a connectivity status of the plug cavities of both the first cassette and the second cassette. The connectivity sensor has a connectivity sensor connector extending through the window of the panel.

DETAILED DESCRIPTION OF THE INVENTION

Figure 1:
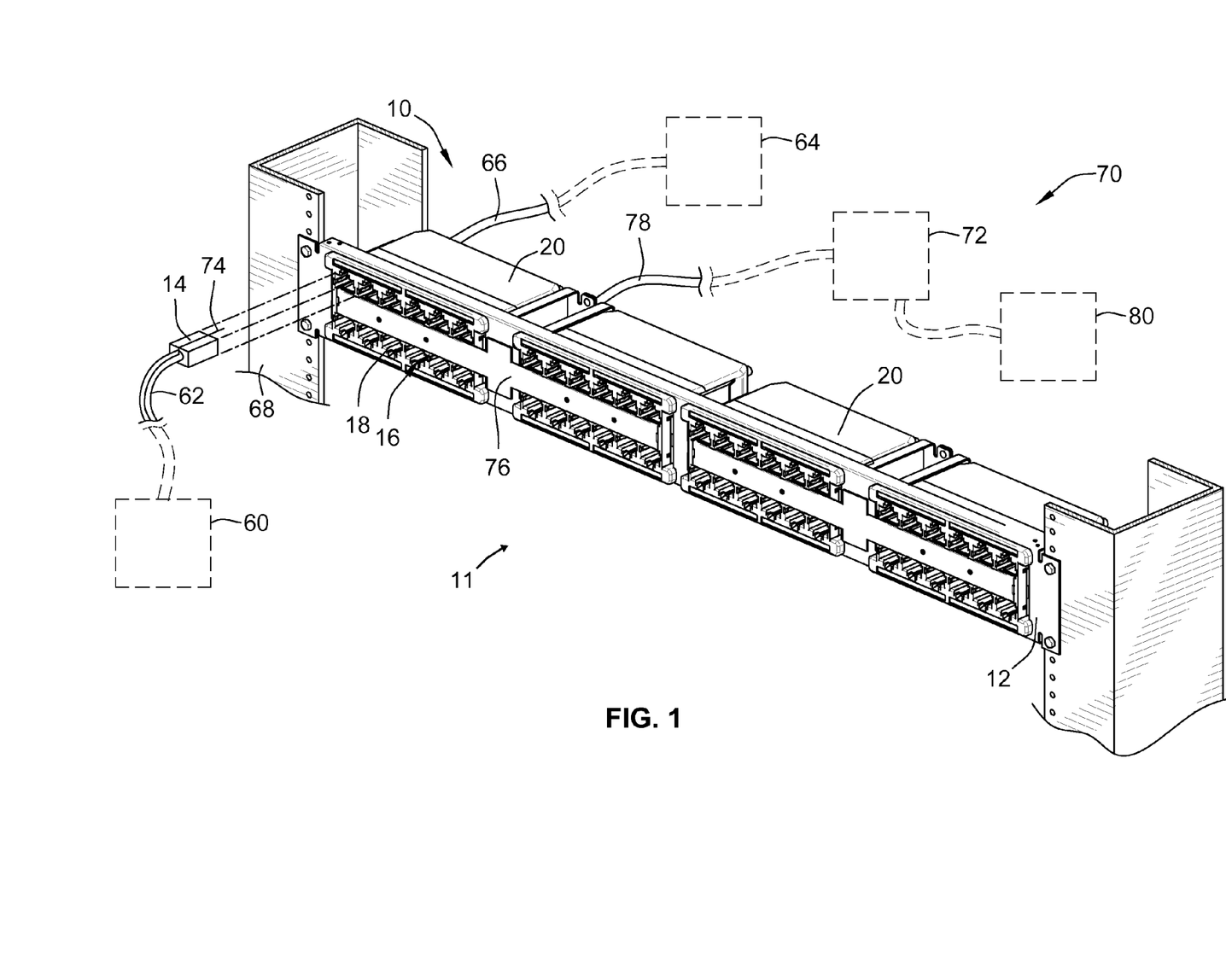
FIG. 1 is a front perspective view of a portion of the cable interconnect system illustrating a plurality of cassettes mounted to a panel assembly formed in accordance with an exemplary embodiment.

FIG. 1 is a front perspective view of a portion of a cable interconnect system 10 illustrating a panel assembly 11 having a panel 12 and a plurality of cassettes 20 mounted to the panel 12. A plug 14 is illustrated being connected to one of the cassettes 20 at a front mating interface 18 of the cassette 20. The cassette 20 includes an array of receptacles 16 for accepting or receiving one or more plugs 14. The array of receptacles 16 defines the front mating interface 18. The receptacles 16 may be of any particular type configured to receive plugs 14 of a corresponding type. For example, in an exemplary embodiment, the receptacles 16 and plugs 14 have metal contacts that transmit data and/or power. In another exemplary embodiment, the receptacle and plug are of the fiber-optic type.

The cable interconnect system 10 is utilized to interconnect various equipment, components and/or devices to one another. FIG. 1 schematically illustrates a first device 60 that is configured to be connected to the cassette 20 via a cable 62. The modular plug 14 is attached to the end of the cable 62. FIG. 1 also illustrates a second device 64 connected to the cassette 20 via a cable 66. The cassette 20 interconnects the first and second devices 60, 64. In an exemplary embodiment, the first device 60 may be a computer located remote from the cassette 20 or a wall jack in another room for receiving an Ethernet cord attached to a computer or other device in that room. Alternatively, the in first device 60 may be another panel located on the same equipment rack or in the same equipment room. The second device 64 may be a network switch. Optionally, the second device 64 may be mounted to the support structure 68. Alternatively, the second device 64 may be a computer or wall jack located remote from the cassette 20. The first and/or second devices 62, 64 may be located in the vicinity of the cassette 20, such as in the same equipment room, or alternatively, may be located remote from the cassette 20.

The cable interconnect system 10 includes a support structure 68, a portion of which is illustrated in FIG. 1, for supporting the panel 12 and the cassettes 20. For example, the support structure 68 may be an equipment rack of a network system. In an exemplary embodiment, the panel 12 is a patch panel that is mounted to the equipment rack. In alternative embodiments, rather than a patch panel, the panel 12 may be another type of network component, used with a network system that supports cassettes 20 and/or other connector, assemblies, such as interface modules, stacked jacks, or other individual modular jacks. For example, the panel 12 may be a wall or other structural element of a component. It is noted that the cable interconnect system 10 illustrated in FIG. 1 is merely illustrative of an exemplary system or component for interconnecting communication cables.

The cable interconnect system 10 utilizes a connectivity management system 70 for monitoring and/or managing the connectivity of the cable interconnect system 10. For example, the connectivity management system 70 determines a connectivity status of each of the receptacles 16. The connectivity management system 70 includes an analyzer 72 for analyzing the connectivity of the components within the cable interconnect system 10. The analyzer 72 may be any type of electronic component that monitors connectivity status of the various components of the cable interconnect system 10.

In an exemplary embodiment, the plug 14 includes a network sensor probe 74 used to indicate connectivity, as described in further detail below. The sensor probe 74 represents an additional contact associated with the plug 14. In the cable interconnect system 10, the cables 62 may be routed between various ones of the panels 12 or other network components. The plugs 14 with the sensor probes 74 may come from other equipment in the cable interconnect system 10.

The cassettes 20 include connectivity sensors 76 at the mating interface thereof for interfacing with the sensor probes 74 when the plugs 14 are received in the receptacles 16. The connectivity sensors 76 are used to indicate connectivity, such as by sensing the connectivity status of the sensor probes 74 and sending signals relating to the connectivity status of the sensor probes 74 to the analyzer 72, such as via connectivity cables 78 that interconnect the cassettes 20 and the analyzer 72. The panel 12, cassettes 20 and connectivity sensors 76 together define the panel assembly 11 that may be packaged together or sold separately. For example, the panel 12 and connectivity sensors 76 may be sold separately as a kit from the cassettes 20. Different types of cassettes 20 may be used with the same panel 12 and connectivity sensors 76. For example, different cassettes 20 having different mating interfaces may be assembled with the panel 12. The connectivity sensors 76 may be removed to remove a particular cassette 20 and replace the cassette 20 with a different cassette 20. The connectivity sensor 76 may then be re-assembled with the cassette 20 and panel 12.

Connectivity cables 78 are cables that form part of the connectivity management system 70 and generally interconnect the cassettes 20 with the analyzer 72. Connectivity cables 78 extend from the rear of the cassettes 20 as opposed to the communication babies 62 which extend from the front of the cassettes 20. Communication cables may also extend from the rear of the cassettes 20. The cables 62 are part of the cable interconnect system 10 and are used to transmit data between components of the cable interconnect system 10, as opposed to the connectivity management system 70.

The analyzer 72 determines the connectivity status of the receptacles 16 within the cable interconnect system 10 by determining which plug 14 is connected to which receptacle 16 and/or where each patch cord or cable 62 is routed within the cable interconnect system 10. The analyzer 72 may also determine the connectivity status of the receptacles 16 by determining if data or power is being transmitted through the particular receptacle 16. Optionally, the analyzer 72 may be mounted to a rack or other support structure of the cable interconnect system 10. Alternatively, the analyzer 72 may be positioned remote from the rack and the network panels 12. Data relating to the connectivity or interconnection of the patch cords or cables 62 is transmitted to the analyzer 72 by the connectivity tables 78.

In an exemplary embodiment, the analyzer 72 is interconnected with a computing device 80 by an Ethernet connection or another connection, such as a direct connection by a cable connector. The connectivity data is gathered by connectivity sensors 76 that sense when the plugs 14 are mated with the receptacles 16. The connectivity data gathered by the analyzer 72 may be transmitted to the computing device 80 and then viewed, stored and/or manipulated by the computing device 80. Alternatively, the analyzer 72 may store and/or manipulate the connectivity data. Optionally, the analyzer 72 and the computing device 80 may be one device. Optionally, multiple analyzers 72 may be connected to the computing device 80. The analyzer 72 may be a general purpose computer. The analyzer 72 may include a processor, memory, software, hardware and the like. The analyzer 72 may be housed within the equipment room, or alternatively, may be housed elsewhere.

Figure 2:
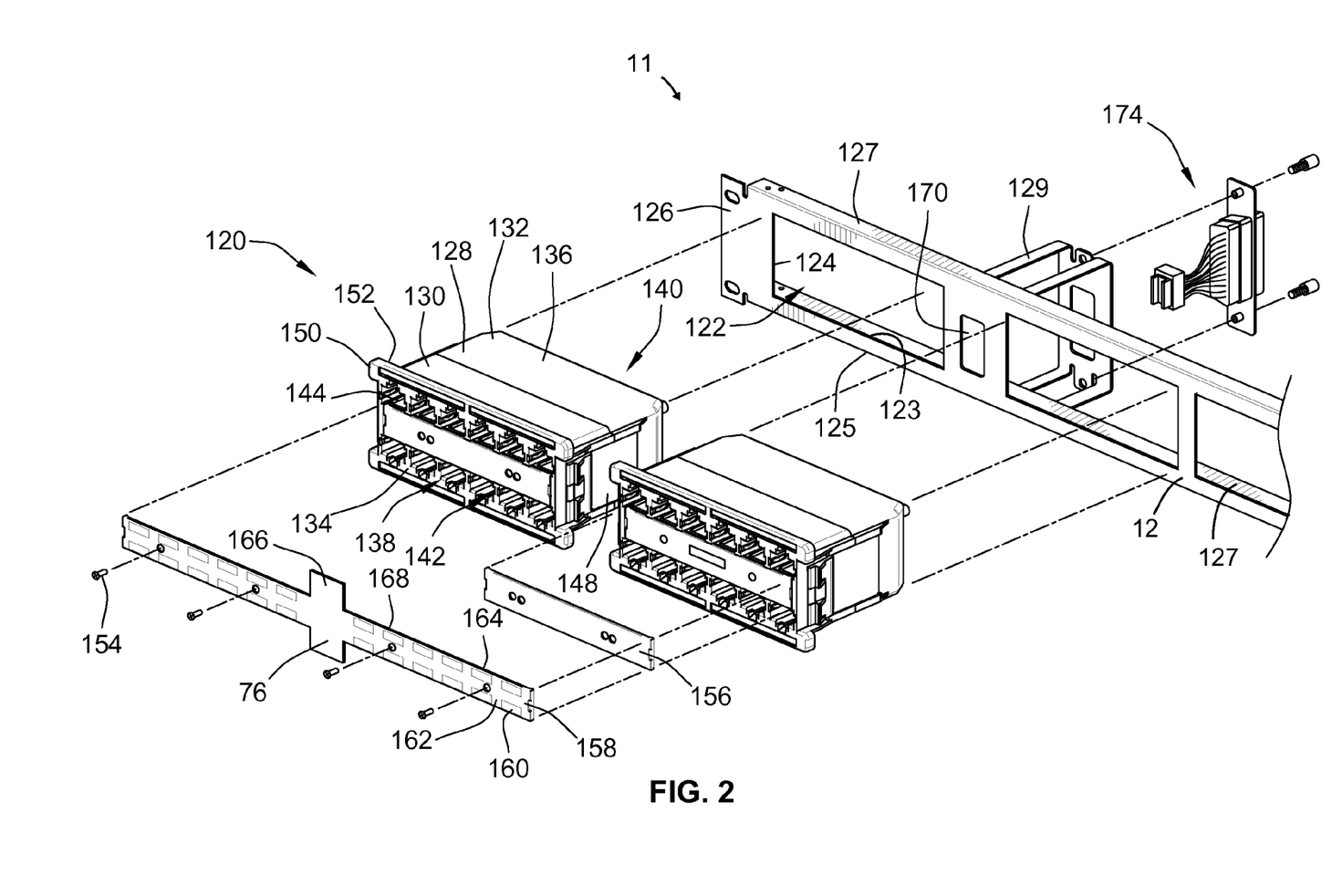
FIG. 2 is an exploded front perspective view of a portion of the panel and exemplary cassettes for mounting to the panel illustrating a connectivity sensor for the cassettes.

FIG. 2 is an exploded front perspective view of the panel assembly 11 illustrating a portion of the panel 12 and exemplary cassettes 120 for mounting to the panel 12. Only one side of the panel 12 and two of the cassettes 120 are illustrated. The connectivity sensor 76 is arranged for mating to the 120. In an exemplary embodiment, the cassettes 120 may be similar to the cassettes described in U.S. application Ser. No. 12/395,049 filed on Feb. 27, 2009 titled CASSETTE FOR USE WITHIN A CONNECTIVITY MANAGEMENT SYSTEM, the complete subject matter of which is hereby incorporated by reference in its entirety.

The cassettes 120 are configured to be mounted within openings 122 of the panel 12. The openings 122 are defined by a perimeter wall 124. In an exemplary embodiment, the panel 12 includes a plurality of openings 122 for receiving a plurality of cassettes 120. The panel 12 includes a planar front surface 125 and a planar rear surface 123 opposite the front surface 125. The cassettes 20 are loaded into the openings 122 from the front and are mounted against the front surface 125. The panel 12 includes mounting tabs 126 on the sides thereof for mounting to the support structure 68 (shown in FIG. 1). For example, the mounting tabs 126 may be provided at the sides of the panel 12 for mounting to a standard equipment rack or other cabinet system. Optionally, the panel 12 and mounting tabs 126 fit into 1 U height requirements. The panel 12 includes top and bottom rails 127 extending rearward from the rear surface 123. The rails 127 provide rigidity to the panel 12. In an exemplary embodiment, the panel 12 includes one or more brackets 129 extending rearward from the rear surface 123. The brackets 129 may be integrally formed with the panel 12. Alternatively, the brackets 129 may be secured, to the panel 12, such as by welding the brackets 129 to the panel 12.

The cassette 120 includes a shell 128 defining an outer perimeter of the cassette 120. In an exemplary embodiment, the shell 128 is a two piece design having a housing 130 and a cover 132 that may be coupled to the housing 130. The housing 130 and the cover 132 may have similar dimensions (e.g. height and width) to nest with one another to define a smooth outer surface. The housing 130 and the cover 132 may also have similar lengths, such that the housing 130 and the cover 132 mate approximately in the middle of the shell 128. Alternatively, the housing 130 may define substantially all of the shell 128 and the cover 132 may be substantially flat and be coupled to an end of the housing 130. Other alternative embodiments may not include the cover 132.

The shell 128 includes a front 134 and a rear 136 with the housing 130 at the front 134 and the cover 132 at the rear 136. The cassette 120 has a front mating interface 138 defined at the front 134. The cassette 120 has a rear mating interface 140 defined at the rear 136. The front mating interface 138 is defined by the structure of the housing 130, a plurality of plug cavities 142 formed in the housing 130 for receiving plugs, such as the modular plugs 14 (shown in FIG. 1), as well as communication modules 144 arranged within the shell 128 for mating with the plugs. The plug cavities 142 define receptacles that receive the plugs. The communication modules 144 are configured to be directly electrically connected to the plugs when the plugs are loaded into the plug cavities 142. The communication modules 144 transmit signals through the cassette 120. The plug cavities 142 and communication modules 144 cooperate to define a particular mating interface configured to receive a certain type of plug. In the illustrated embodiment, the plug cavities 142 and communication modules 144 are configured to receive an 8 position, 8 contact (8P8C) type of plug, such as an RJ-45 plug or another copper-based modular plug type of connector. Alternatively, the plug cavities 142 and communication modules 144 may be configured to receive different types of plugs, such as fiber-optic type of plugs. In an exemplary embodiment, the plug cavities 142 are arranged in a stacked configuration in a first row and a second row. A plurality of plug cavities 142 are arranged in each of the first and second rows.

The cassette 120 includes latch members 148 on one or more sides of the cassette 120 for securing the cassette 120 to the panel 12. The latch members 148 may be held close to the sides of the cassette 120 to maintain a smaller form factor. Alternative mounting means may be utilized in alternative embodiments. The latch members 148 may be separately provided from the housing 130 and/or the cover 132. Alternatively, the latch members 148 may be integrally formed with the housing 130 and/or the cover 132. The latch members 148 may additionally be used to couple the housing 130 and the cover 132 together.

During assembly, the cassettes 120 are loaded into the openings 122 of the panel 12 from the front of the panel 12 in a loading direction. The outer perimeter of the cassette 120 may be substantially similar to the size and shape of the perimeter walls 124 defining the openings 122 such that the cassette 120 fits snugly within the openings 122. The latch members 148 are used to secure the cassettes 120 to the panel 12. In an exemplary embodiment, the cassettes 120 include a front flange 150 at the front 134 of the shell 128. The flange 150 has a rear engagement surface 152 that engages the front surface 125 of the panel 12 when the cassette 120 is loaded into the opening 122. The latch members 148 engage the rear surface 123 of the panel 12 to capture the panel between latch members 148 and the rear engagement surface 152.

The connectivity sensor 76 is coupled to the cassettes 120. In an exemplary embodiment, the connectivity sensor 76 is coupled to the front 134 of the shell 128 generally between rows of the plug cavities 142. The connectivity sensor 76 is used to monitor a connectivity status of the various communication modules 144 of the cassette 120, such as by sensing the sensor probes 74 (shown in FIG. 1) of the plugs 14 when the plugs 14 are received the plug cavities 142. Optionally, the connectivity sensor 76 is coupled to a pair of cassettes 120 such that the connectivity sensor 76 determines the connectivity status of more than one cassette 120. Alternatively, the connectivity sensor 76 may be configured to be coupled to more or less than two cassettes 120. The connectivity sensor 76 is coupled to the cassettes 120 using fasteners 154. In an exemplary embodiment, spacers 156 may be attached to the cassettes 120. The spacers 156 define a mounting surface for the connectivity sensor 76. The spacers 156 position the mounting surface flush with the front 134 of the shell 128.

The connectivity sensor 76 includes a circuit board 158 having a plurality of sensor pads 160 arranged on a front side 162 of the connectivity sensor 76. The connectivity sensor 76 is mounted to the cassettes 120 such that a rear side 164 of the connectivity sensor 76 generally faces and/or engages the front 134 of the shell 128. The connectivity sensor 76 is mounted to the shell 128 such that the sensor pads 160 are aligned with corresponding plug cavities 142. For example, some of the sensor pads 160 may be arranged below one row the plug cavities 142, and some of the sensor pads 160 may be arranged above another row of the plug cavities 142. Optionally, an equal number of sensor pads 160 and plug cavities 142 are provided. In an exemplary embodiment, the connectivity sensor 76 includes a hub 166 and fingers 168 that extend in opposite directions from the hub 166. The sensor pads 160 are arranged on the fingers 168. The connectivity sensor 76 is coupled to the cassettes 120 such that the hub 166 is positioned in line with the space between the cassettes 120 when the cassettes 120 are mounted to the panel 12.

In an exemplary embodiment, the hub 166 is aligned with a window 170 in the panel 12. The connectivity sensor 76 includes a connectivity sensor connector 172 (shown in FIG. 3) extending from the rear side 164 of the circuit board 158. The connectivity sensor connector 172 is configured to be received within the window 170 when the cassettes 120 are mounted to the panel 12. A cable assembly 174 is connected to the connectivity sensor 76. For example, the cable assembly 174 is mated With the connectivity sensor connector 172. The cable assembly 174 may also be connected to a mating connector 182 (shown in FIG. 3) for mating to the sensor connector 172 and an I/O connector 184 (shown in FIG. 3) associated with the connectivity cable 78 (shown in FIG. 1) such that data from the connectivity sensor 76 may be transmitted to the connectivity cable 78 via the cable assembly 174. The cable assembly 174 may be coupled to the bracket 129 and thus held by the panel 12.

Figure 3:
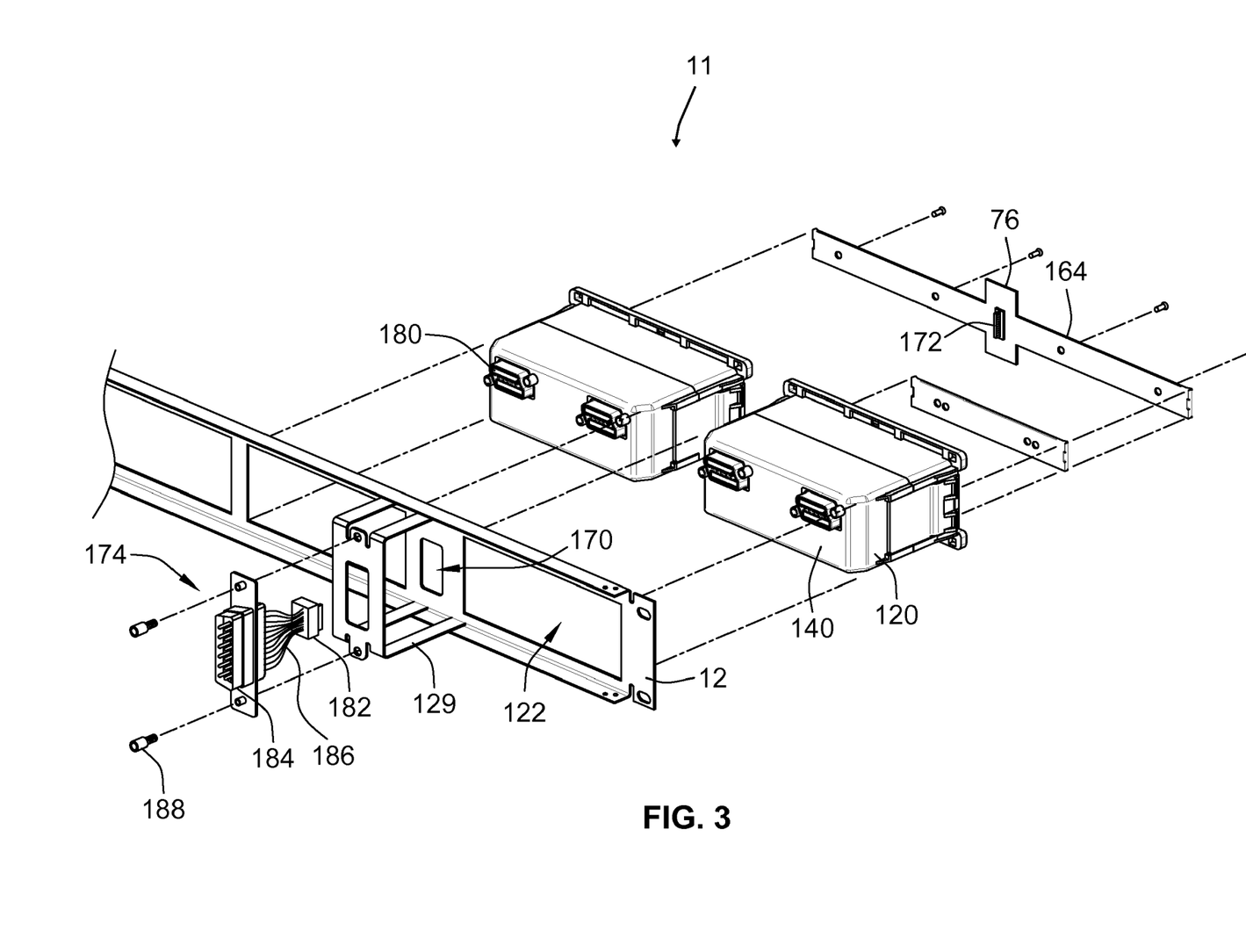
FIG. 3 is an exploded rear perspective view of a portion of the panel and the cassettes shown in FIG. 2.

FIG. 3 is an exploded rear perspective view of the panel assembly 11 illustrating a portion of the panel 12 and the cassettes 120 showing the rear mating interface 140 of the cassette 120. The cassettes 120 include connector modules 180 defining portions of the rear mating interface 140. The connector modules 180 are electrically connected to the communication modules 144 (shown in FIG. 2). In the illustrated embodiment, the connector modules 180 are represented by RJ-21 type connectors, however, it is realized that other types of connectors may be used rather than RJ-21 type of connectors. For example, in alternative embodiments, the connector modules 180 may be another type of copper-based modular connectors, fiber optic connectors or other types of connectors, such as eSATA connectors, HDMI connectors, USB connectors, FireWire connectors, and the like.

As will be described in further detail below, the connector modules 180 are high density connectors, that is, each connector module 180 is electrically connected to more than one of the communication modules 144 (shown in FIG. 2) to allow communication between multiple plugs and the cable connector that mates with the connector module 180. The connector modules 180 are electrically connected to more than one communication module 144 to reduce the number of cable assemblies that interface with the rear of the cassette 120. It is realized that more or less than two connector modules 180 may be provided in alternative embodiments.

The connectivity sensor connector 172 extends from the rear side 164 of the connectivity sensor 76. The cable assembly 174 includes a mating connector 182 that mates with the connectivity sensor connector 172. The cable assembly 174 also includes an input/output (I/O) connector 184. A wire harness 186 extends between the mating connector 182 and the I/O connector 184. The I/O connector 184 is configured to be mounted to the bracket 129 using fasteners 188. The wire harness 186 and mating connector 182 extend forward from the I/O connector 184 to mate with the connectivity sensor connector 172, which extends through the window 170 in the panel 12. The window 170 is arranged between adjacent openings 122 in the panel 12. The I/O connector 184 is held by the bracket 129 for mating with a corresponding connector of the connectivity cable 78 (shown in FIG. 1). Data is communicated between the connectivity sensor 76 and the connectivity cable 78 by the cable assembly 174.

Figure 4:
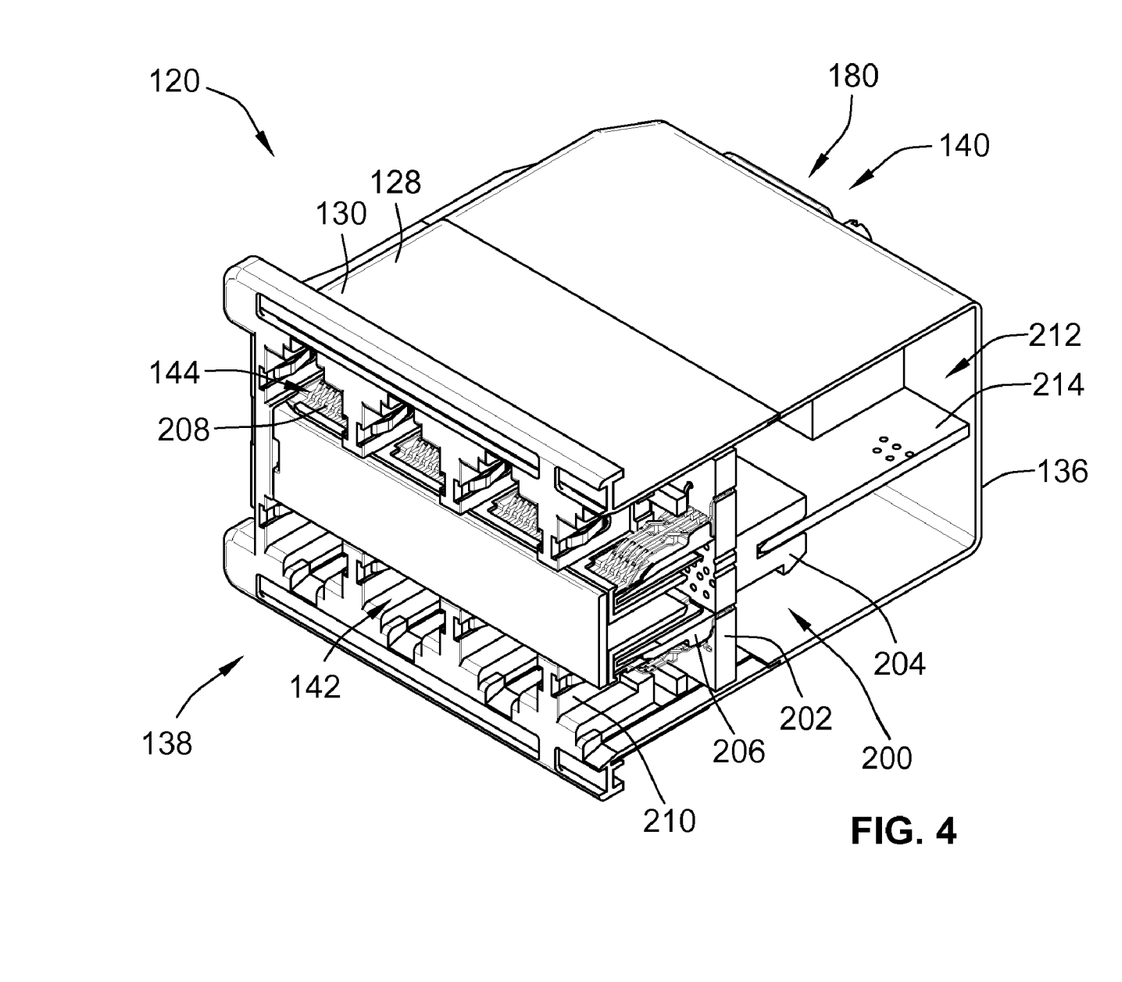
FIG. 4 is a front partial sectional view of one of the cassettes shown in FIG. 2.

FIG. 4 is a front perspective, partial cutaway view of the cassette 120 illustrating a contact subassembly 200 of the cassette 120. The contact subassembly 200 includes the communication modules 144 and the connector modules 180. The contact subassembly 200 provides a link between the front mating interface 138 and the rear mating interface 140.

In the illustrated embodiment, the contact subassembly 200 includes a circuit board 202 and an electrical connector 204 mounted to the circuit board 202. In an exemplary embodiment, the electrical connector 204 is a card edge connector. The communication modules 144 each include a contact support 206 and a plurality of contacts 208 arranged as a contact set extending from a front side of the circuit board 202. The contact supports 206 are positioned in close proximity to a corresponding set of the contacts 208. Each contact support 206 supports the contacts 208 of a different contact set.

The contacts 208 are electrically connected to the circuit board 202 and are electrically connected to the electrical connector 204 via the circuit board 202. Each contact set defines a different communication module 144. Optionally, the circuit board 202 may form part of the communication module 144, such that each of the communication modules 144 are linked together by a common circuit board 202. Alternatively, individual circuit boards 202 associated with each of the communication modules 144 may be provided and held within the shell 128 separate from the other circuit boards 202 and corresponding communication modules 144.

In the illustrated embodiment, each communication module 144 includes eight contacts 208 arranged as a contact array. The contacts 208 constitute a contact array that is configured to mate with plug contacts of an RJ-45 modular plug. The contacts 208 may have a different configuration for mating with a different type of plug in alternative embodiments.

During assembly, the contact subassembly 200 is loaded into the shell 128 such that the communication modules 144 are loaded into corresponding plug cavities 142. For example, the contact supports 206 and the contacts 208 are loaded into corresponding plug cavities 142. In an exemplary embodiment, a portion of the housing 130 extends between adjacent contact supports 206. For example, the housing 130 may include interior walls 210 that define the individual plug cavities 142. The interior walls 210 are positioned between adjacent communication modules 144 within each of the rows. The interior walls 210 are also positioned between the two rows such that the interior walls 210 are positioned between adjacent communication modules 144 within each column.

The cassette 120 includes an interface connector assembly 212 that includes the connector modules 180. The interface connector assembly 212 is configured to be mated with the electrical connector 204. In an exemplary embodiment, the interface connector assembly 212 includes a circuit board 214. The connector modules 180 are mounted to a side surface of the circuit board 214. An edge of the circuit board 214 is plugged into the electrical connector 204.

In an exemplary embodiment, the circuit board 202 is arranged generally perpendicular to the loading direction of the plugs into the plug cavities 142. The circuit board 202 is positioned generally behind the contacts 208, such as between the contacts 208 and the rear 136 of the shell 128. The circuit board 202 substantially covers the rear of each of the plug cavities 142 when the connector subassembly 200 is loaded into the shell 128.

Figure 5:
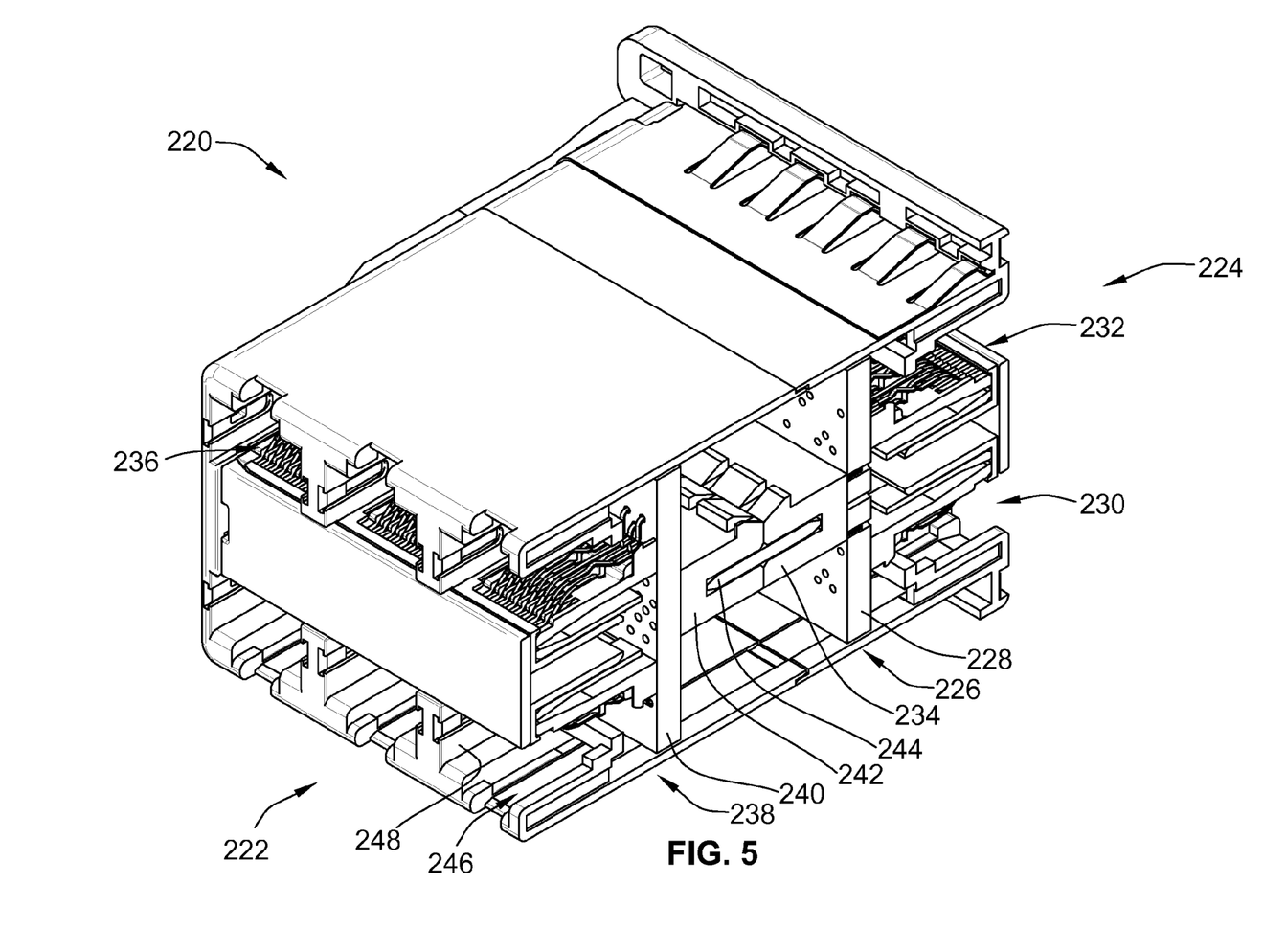
FIG. 5 is a rear partial sectional view of an alternative cassette for the table interconnect system shown in FIG. 1.

FIG. 5 is a rear partial sectional view of an alternative cassette 220 for the cable interconnect system 10 (shown in FIG. 1). The cassette 220 is similar to the cassette 120 (shown in FIG. 2) in some respects, however the cassette 220 includes a different rear mating interface 222. The cassette 220 may be used in place of the cassette 120. For example, the cassette 220 has similar dimensions as the cassette 120 such that the cassette 220 may be loaded into the panel 12 (shown in FIG. 1). The connectivity sensor 76 (shown in FIG. 1) may be coupled to the cassette 220 and used to monitor a connectivity status of the cassette 220.

The cassette 220 includes a front mating interface 224 that is similar to the cassette 120. The cassette 220 includes a contact subassembly 226 having a circuit board 228 and a plurality of communication modules 230 extending from the circuit board 228 into plug cavities 232 at the front mating interface 224. The contact subassembly 226 includes an electrical connector 234 extending from circuit board 228.

The cassette 220 includes a plurality of connector modules 236 at the rear mating interface 222. The connector modules 236 are electrically connected to the communication modules 230. Data and/or power may be transmitted between the communication modules 230 and corresponding ones of the connector modules 236. In an exemplary embodiment, the cassette 220 includes an interface connector assembly 238 that includes a circuit board 240. The connector modules 236 are connected to the circuit board 240. The interface connector assembly 238 may be substantially similar to the contact subassembly 226. For example, an equal number of communication modules 230 and connector modules 236 may be provided. The communication modules 230 and the connector modules 236 may be connected to one another in a one-to-one relationship. The communication modules 230 and the connector modules 236 may be configured to receive plugs of the same type, for example, both may receive an RJ-45 plug or another copper-based modular plug type of connector. The interface connector assembly 238 includes an electrical connector 242. The electrical connector 242 may be connected to the electrical connector 234 of the contact subassembly 226.

In the illustrated embodiment, both electrical connectors 234, 242 represent card edge connectors. A circuit board 244 is plugged into both electrical connectors 234, 242, where data is transmitted across the circuit board 244 between the electrical connectors 234, 242. In alternative embodiment, the electrical connectors 234, 242 may be directly connected to one another. For example, one of the electrical connectors 234, 242 represents a socket while the other represents a plug. In another alternative embodiment, the cassette 220 may include a single circuit board between the communication modules 230 and the connector modules 238. The circuit board may be arranged parallel to the front and rear of the cassette 220 such that the communication modules 230 extending from one side of the circuit board and the connector modules 236 extend from the opposite side of the circuit board. Alternatively, the circuit board may be arranged perpendicular to the front and rear of the cassette 220 such that the communication modules 230 are arranged at one edge of the circuit board and the connector modules 236 are arranged at the opposite edge of the circuit board. The communication modules 230 may extend from both sides of the circuit board at the edge. Similarly, the connector modules 236 may extend from both sides of the circuit board at the other edge.

The rear mating interface 222 includes a plurality of plug cavities 246. The connector modules 236 are arranged within the plug cavities 246. The cassette 220 includes interior walls 248 that define the plug cavities 246. The connector modules 236 are loaded into the plug cavities 246 from the interior of the cassette 220. The plug cavities 246 are sized and shaped the same as the plug cavities 232, such that the plug cavities 232, 246 receive the same type of plugs.

Figures 6, 7, 8:
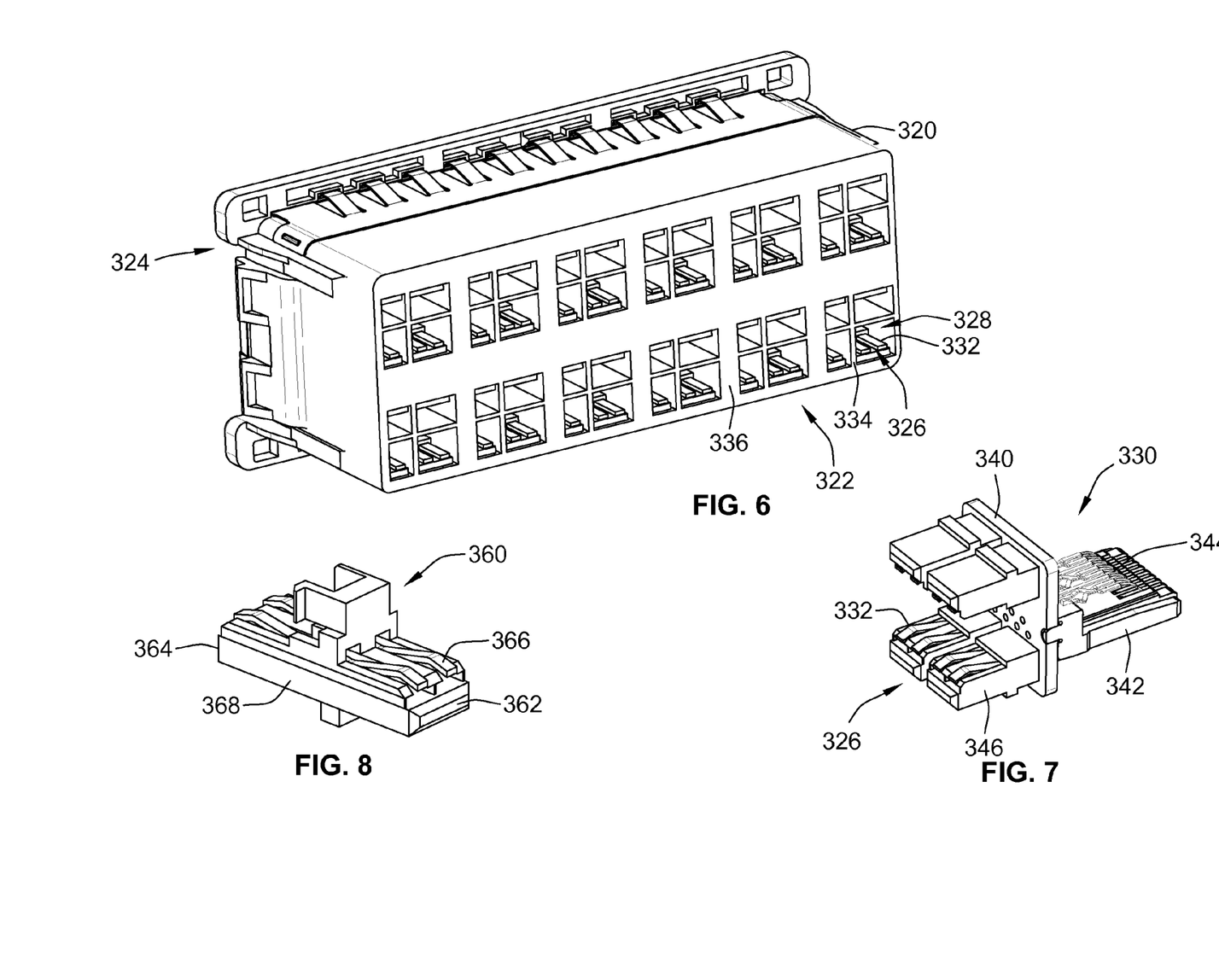
FIG. 6 is a rear perspective view of another alternative cassette for the cable interconnect system shown in FIG. 1.
FIG. 7 illustrates a communication module for the cassette shown in FIG. 6.
FIG. 8 illustrates an alternative communication module for use in an alternative cassette.

FIG. 6 is a rear perspective view of an alternative cassette 320 for the cable interconnect system 10 (shown in FIG. 1). The cassette 320 is similar to the cassette 120 (shown in FIG. 2) in some respects, however the cassette 320 includes a different rear mating interface 322. The cassette 320 may be used in place of the cassette 120. For example, the cassette 320 has similar dimensions as the cassette 120 such that the cassette 320 may be loaded into the panel 12 (shown in FIG. 1). The connectivity sensor 76 (shown in FIG. 1) may be coupled to the cassette 320 and used to monitor a connectivity status of the cassette 320.

The cassette 320 includes a front mating interface 324 that is similar to the front mating interface 134 of the cassette 120. The cassette 320 includes a plurality of connector modules 326 at the rear mating interface 322. The connector modules 326 are arranged within corresponding plug cavities 328 of the cassette 320 at the rear mating interface 322. The connector modules 326 are electrically connected to corresponding communication modules 330 (shown in FIG. 7). Data and/or power may be transmitted between the communication modules 330 and the connector modules 326.

In the illustrated embodiment, the connector modules 326 and plug cavities 328 represent a quad-type mating interface configured to receive a quad-type plug connector therein. The connector modules 326 each include contacts 332. The contacts 332 are arranged in pairs in different quadrants of the plug cavities 328. Wall segments 334 divide the plug cavities 328 into quadrants, with each quadrants receiving a pair of the contacts 332. Optionally, the wall segments 334 may provide shielding from adjacent quadrants. The cassette 320 includes interior walls 336 that define the plug cavities 328. Optionally, the wall segments 334 may be formed integral with the interior walls 336. Alternatively, the wall segments 334 may be separate and distinct from the interior walls 336, and coupled thereto.

FIG. 7 illustrates a contact subassembly including a communication module 330 and a connector module 326 for the cassette 320 (shown in FIG. 6). The communication module 330 includes a circuit board 340, a contact support 342, and a plurality of contacts 344 arranged as a contact set. The contact support 342 and the contacts 344 extend from a front side of the circuit board 340.

The connector module 326 extends from a rear side of the circuit board 340. The connector module 326 includes a plurality of support towers 346 mounted to the circuit board 340. The support towers 346 hold the contacts 332. Each of the contacts 332 are electrically connected to corresponding ones of the contacts 344 via the circuit board 340. The arrangement of the contacts 332 is different from the contacts 344. For example, the contacts 344 arranged in a single row, whereas the contacts 332 are arranged in pairs in quadrants.

FIG. 8 illustrates an alternative communication module 360 for use in an alternative cassette (not shown). The communication module 360 includes a front 362 and a rear 364. The communication module 360 defines a connector module at the rear 364. When the communication module 360 is arranged within the cassette, the front 362 defines a front mating interface of the cassette, and rear 364 defines a connector module at a rear mating interface of the cassette.

In an exemplary embodiment, the communication module 360 forms part of a mating interface similar to the rear mating interface 322 (shown in FIG. 6) of the cassette 320 (shown in FIG. 6). For example, the communication module 360 is configured to be mated with a quad-type plug connector. Four of the communication modules 360 are arranged in a group to mate with a single quad-type plug connector.

The communication module 360 includes a pair of contacts 366 held by a body 368. The contacts 366 extend between the front 362 and the rear 364. Each contact 366 has a unitary body between the front 362 and the rear 364. Alternatively, a front contact and the rear contact may be provided and coupled to one another and/or to a circuit board therebetween.

Figure 9:
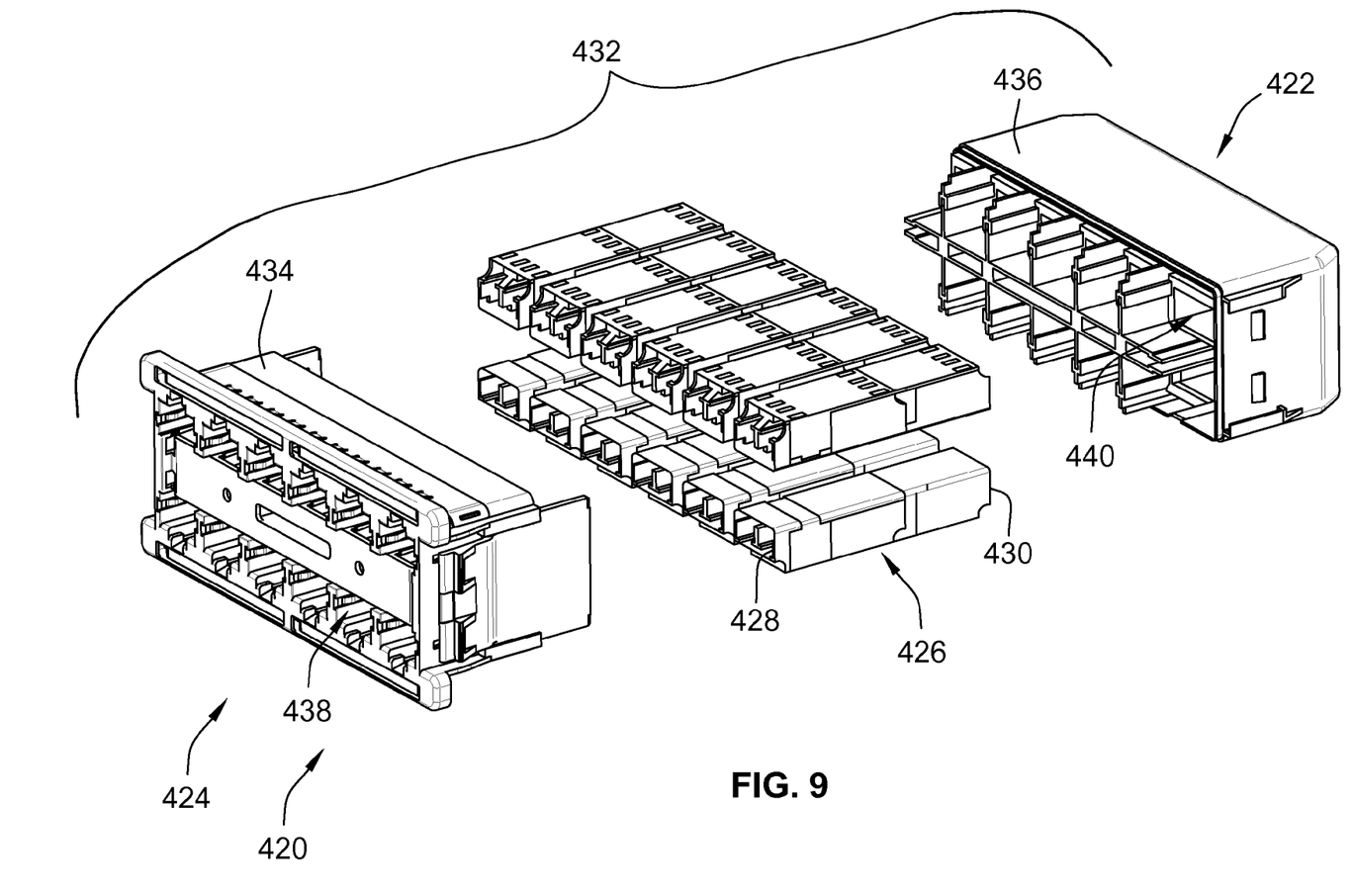
FIG. 9 is a front exploded view of yet another alternative cassette.

FIG. 9 is a front exploded view of yet another alternative cassette 420 for the cable interconnect system 10 (shown in FIG. 1). The cassette 420 is similar to the cassette 120 (shown in FIG. 2) in some respects, however the cassette 420 includes a rear mating interface 422 and a front mating interface 424 that differ from the cassette 120. In the illustrated embodiment, the cassette 420 has a fiber-optic type mating interface at the rear mating interface 422 and at the front mating interface 424. The cassette 420 is configured to mate with fiber-optic type plug connectors at the rear mating interface 422 and at the front mating interface 424.

The cassette 420 may be used in place of the cassette 120. For example, the cassette 420 has similar dimensions as the cassette 120 such that the cassette 420 may be loaded into the panel 12 (shown in FIG. 1). The connectivity sensor 76 (shown in FIG. 1) may be coupled to the cassette 420 and used to monitor a connectivity status of the cassette 420.

The cassette 420 includes a plurality of communication modules 426. The communication modules 426 each include a front 428 and a rear 430. The communication module 426 defines a connector module at the rear 430. When the communication module 426 is arranged within the cassette 420, the front 428 is arranged at the front mating interface 424 of the cassette 420 for mating with a corresponding plug. When the communication module 426 is arranged within the cassette 420, the rear 430 defines the connector module and is arranged at the rear mating interface 422 of the cassette 420 for mating with a corresponding plug.

The cassette 420 includes a shell 432 having a housing 434 at a front of the shell 432 and a cover 436 at a rear of shell 432. The housing 434 defines a plurality of plug cavities 438. The cover 436 defines a plurality of plug cavities 440. When the housing 434 and cover 436 are assembled, the cavities 438, 440 are aligned with one another. The communication modules 426 are loaded into corresponding plug cavities 438 of the housing 434 and corresponding plug cavities 440 of the cover 436. The communication modules 426 are arranged within the cassette 420 for mating with corresponding plugs loaded into the plug cavities 438 and/or 440.

Figure 10:
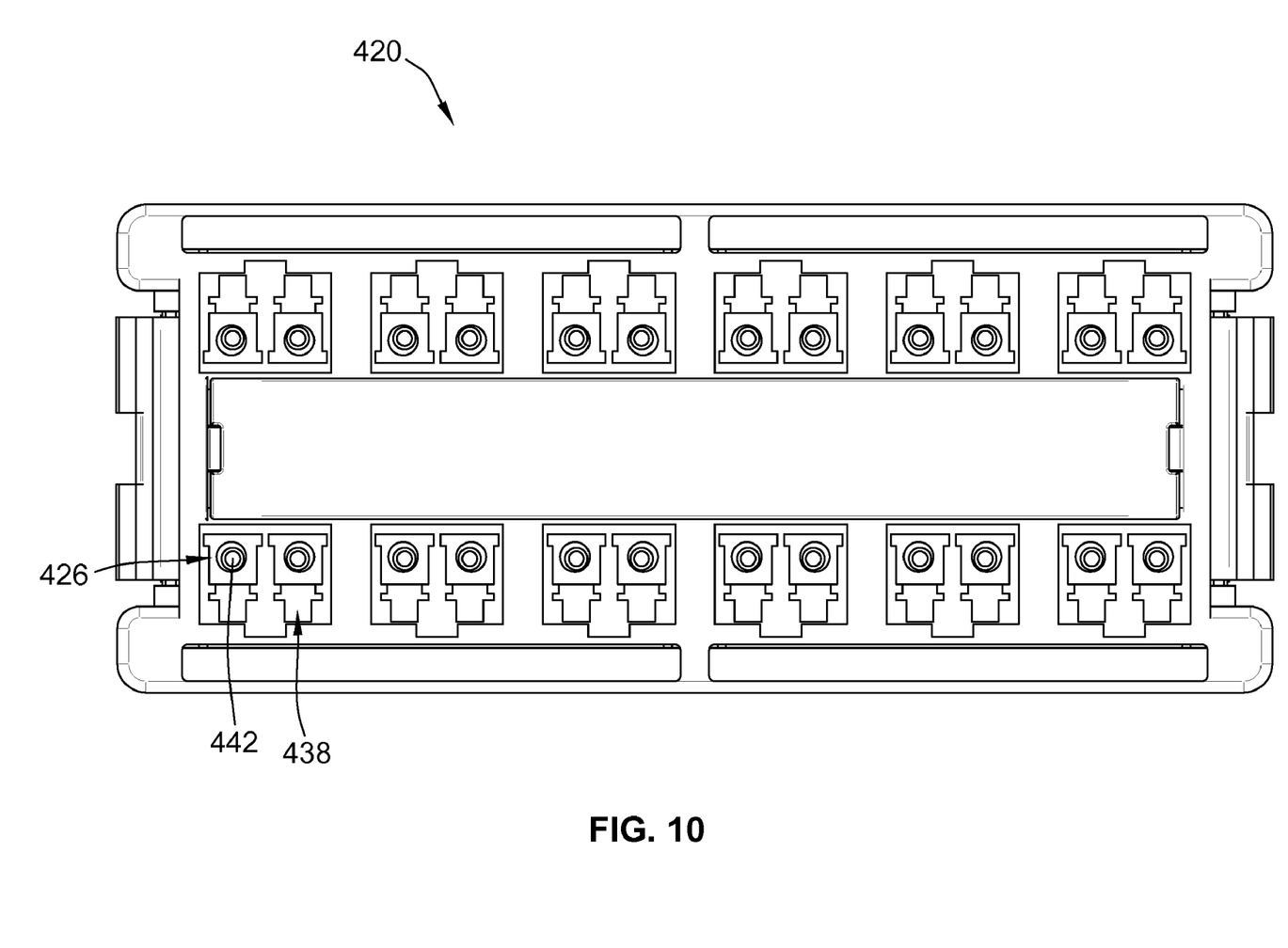
FIG. 10 is a front view of the cassette shown in FIG. 9.

FIG. 10 is a front view of the cassette 420 illustrating the plug cavities 438 and the communication modules 426 arranged within the corresponding plug cavities 438. Fiber-optic type plugs are configured to be loaded into the plug cavities 438 to mate with the communication modules 426. The communication modules 426 include ferrules 442 for mating with the fiber-optic plugs.

With reference back to the Figures generally, the cable interconnect system 10 is modular in design to accommodate interconnecting components of different types of communication networks. For example, the panel 12 is configured to receive each of the various types of cassettes 20, 120, 220, 320, 420. For example, the outer perimeters of the cassettes may be substantially identical such that each of the cassettes wit into the openings 122 in the panel 12. As such, different mating interfaces may be presented at the panel for interconnecting different types of plugs and corresponding components of the networks. For example, the mating interfaces may be either copper based or fiber-optic based for receiving corresponding copper or fiber-optic plugs. The front mating interface may be the same as the rear mating interface, or alternatively, may be different than the rear mating interface. Additionally, different types of cassettes may be provided within the same panel 12. For example, a cassette having an RJ-45 type mating interface may be placed in the panel 12 next to a cassette having a quad type mating interface and/or a fiber-optic type mating interface. The cassettes may be removed and replaced with different types of cassettes, such as when the network system is being upgraded to utilize a different type of network cable or patch cable.

In the panel assembly 11, each of the cassettes 20, 120, 1220, 320, 420 are designed to mate with the connectivity sensor 76. The plug cavities of the cassettes are arranged in a similar or identical position irrespective of the type of cassette, such that the sensor pads 160 are properly positioned for mating with the plugs loaded into the plug cavities. As such, the same connectivity sensor 76 may be coupled to a cassette having an RJ-45 type mating interface, a cassette having a quad type mating interface or a cassette having, a fiber-optic type mating interface, or a cassette having another type of mating interface. The corresponding plugs (e.g. RJ-45 plug, quad plug or fiber-optic plug) include the sensor probe 74 that interfaces with the connectivity sensor 76. In this manner, the same connectivity sensor 76 is configured to sense a connectivity status of an RJ-45 plug, quad plug, fiber-optic plug, or other type of plug if another type of mating interface is provided. The plug 14 illustrated in FIG. 1 is representative of a plug used within a connectivity management system and may have any particular type of mating interface, be it an RJ-45 type mating interface, a quad type mating interface, a fiber optic type mating interface, or another type of mating interface. The analyzer 72 is capable of determining the type of signal being transmitted through the connectivity management system. The connectivity sensor 76 is easily removed from the respective cassette or cassettes and attached to different cassette that replaces the removed cassette.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A panel assembly comprising:
a panel having an opening therethrough that selectively receives either a first cassette or a second cassette, the first and second cassettes having front and rear mating interfaces that mate with cable connectors, the first cassette having at least one of the front and rear mating interfaces being different than the front and rear mating interfaces of the second cassette, respectively, wherein the first cassette is of a first type configured to mate with cable connectors of a first type at the front mating interface, and the second cassette is of a second type configured to mate with cable connectors of a second type at the front mating interface that are different from the first type of cable connectors;

a connectivity sensor mounted to either the first cassette or the second cassette depending on which of the first cassette and the second cassette is received in the opening of the panel, the connectivity sensor sensing a connectivity status of the front mating interface of the corresponding first cassette or second cassette and generating connectivity status signals relating to the connectivity status; and an input/output connector held by the panel, the input/output connector being electrically connected to the connectivity sensor, the input/output connector being configured to be electrically connected to an input/output cable of a connectivity management system that monitors the connectivity status signals of the connectivity sensor.

2. The panel assembly of claim 1, wherein the panel includes a window adjacent the opening, the connectivity sensor includes a connectivity sensor connecter extending from a rear of the connectivity sensor, the connectivity sensor connector extending through the window when the connectivity sensor is mounted to the first or second cassette.

3. The panel assembly of claim 1, wherein the panel includes a bracket mounted to a rear of the panel, the input/output connector being coupled to the bracket.

4. The panel assembly of claim 1, wherein the first cassette is of a first type configured to mate with a first type of cable connectors having sensor probes, and the second cassette is of a second type configured to mate with a second type of cable connectors having sensor probes, the connectivity sensor including a circuit board and sensor pads electrically connected to the circuit board, the sensor pads being configured to interface with the sensor probes of both the first and second types of cable connectors.

5. A panel assembly comprising:

a panel having an opening therethrough that selectively receives either a first cassette or a second cassette, the first and second cassettes having front and rear mating interfaces that mate with cable connectors, the first cassette having at least one of the front and rear mating interfaces being different than the front and rear mating interfaces of the second cassette, respectively;

a connectivity sensor mounted to either the first cassette or the second cassette depending on which of the first cassette and the second cassette is received in the opening of the panel, the connectivity sensor sensing a connectivity status of the front mating interface of the corresponding first cassette or second cassette and generating connectivity status signals relating to the connectivity status;

an input/output connector held by the panel, the input/output connector being electrically connected to the connectivity sensor, the input/output connector being configured to be electrically connected to an input/output cable of a connectivity management system that monitors the connectivity status signals of the connectivity sensor; and a wire harness extending between the connectivity sensor and the input/output connector, the connectivity status signals being transmitted along the wire harness to the input/output connector.

6. The panel assembly of claim 5, wherein the first cassette is of a first type configured to mate with cable connectors of a first type at the front mating interface, and the second cassette is of a second type configured to mate with cable connectors of a second type at the front mating interface that are different from the first type of cable connectors.

7. A panel assembly comprising:

a panel having first and second openings therethrough and a window positioned between the first and second openings;

cassettes loaded into the first and second openings, the cassettes each including a housing having discrete plug cavities at a front of the housing, the plug cavities being configured to receive cable mounted plugs therein, the cassette having communication modules transmitting signals from the plug cavities to at least one connector module at a rear of the housing; and a connectivity sensor mounted to the cassettes along the front of each of the housings, the connectivity sensor sensing a connectivity status of the plug cavities of both the first cassette and the second cassette, the connectivity sensor having a connectivity sensor connector extending through the window of the panel.

8. The panel assembly of claim 7, wherein the panel includes a bracket extending therefrom proximate to the window, the connectivity management system further comprising a wire harness mounted to the bracket, the wire harness having a mating connector mated with the connectivity sensor connector.

9. The panel assembly of claim 7, wherein the connectivity sensor is held relative to the panel by the cassettes such that the connectivity sensor connector extends through the window.

10. The panel assembly of claim 7, wherein the cassettes are identical to one another.

11. The panel assembly of claim 7, wherein the cassettes are removable and replaceable by replacement cassettes having different mating interfaces that receive a different type of cable mounted plugs therein, the connectivity sensor being mounted to the replacement cassettes for sensing a connectivity status of the replacement cassettes.

12. A panel assembly comprising:

a panel having an opening therethrough that selectively receives a first cassette and a second cassette;

the first cassette including a housing having a front mating interface and a rear mating interface, the housing having discrete plug cavities at the front mating interface, the housing having at least one connector module at the rear mating interface, the first cassette having communication modules transmitting signals from the plug cavities to the at least one connector module;

the second cassette including a housing having a front mating interface and a rear mating interface, wherein at least one of the front mating interface and the rear mating interface of the second cassette differs from the front mating interface and the rear mating interface of the first cassette, the housing having discrete plug cavities at the front mating interface, the housing having at least one connector module at the rear mating interface, the second cassette having communication modules transmitting signals from the plug cavities to the at least one connector module; and a connectivity sensor mounted to either the first cassette or the second cassette depending on which of the first cassette and the second cassette is coupled to the panel, the connectivity sensor sensing a connectivity status of the plug cavities of the corresponding first cassette or second cassette.

13. The panel assembly of claim 12, wherein the first cassette is of a first type configured to receive plugs of a first type into the plug cavities, and the second cassette is of a second type configured to receive plugs of a second type into the plug cavities different from the first type of plugs.

14. The panel assembly of claim 12, wherein the plug cavities of the first cassette are configured to receive cable mounted quad connectors therein, the plug cavities of the second cassette are configured to receive cable mounted RJ-45 connectors therein.

15. The panel assembly of claim 12, wherein the communication modules of the first cassette include copper contacts arranged in a predetermined arrangement for mating with a corresponding plug, the communication modules of the second cassette include fiber-optic connectors arranged for mating with fiber-optic plugs.

16. The panel assembly of claim 12, wherein the housing of the first cassette has an outer perimeter configured to fit within the opening, the housing of the second cassette has an outer perimeter being identical to the outer perimeter of the housing of the first cassette.

17. The panel assembly of claim 12, wherein the housing of the first cassette has a front mating interface and a rear mating interface, the front and rear mating interfaces being different than one another.

18. The panel assembly of claim 12, wherein the connectivity sensor includes a circuit board and sensor pads electrically connected to the circuit board, the sensor pads being configured to interface with sensor probes of plugs received in the corresponding plug cavities.

19. The panel assembly of claim 12, wherein the connectivity sensor includes a connectivity sensor connector received in a window of the panel.

20. The panel assembly of claim 12, wherein the housings of the first and second cassettes each include walls defining the plug cavities, the communication modules being loaded into the plug cavities.

21. The panel assembly of claim 12, wherein the first cassette includes a contact sub-assembly having a circuit board, a plurality of the communication modules extend from the circuit board into the plug cavities, at least one communication module being electrically connected to the at least one connector module.

22. The panel assembly of claim 12, further comprising a wire harness coupled to the panel, the wire harness having a mating connector coupled to the connectivity sensor and the wire harness having an input/output connector configured to be electrically connected to an input/output cable of the connectivity management system.

* * * * *